US012809708B2

(12) United States Patent
Choi et al.

(10) Patent No.: US 12,809,708 B2
(45) Date of Patent: Nov. 24, 2026

(54) EVENT MANAGEMENT METHOD USING THERMAL DATA AND COMPUTING APPARATUS FOR PERFORMING THE SAME

(71) Applicant: ELECTRONICS AND TELECOMMUNICATIONS RESEARCH INSTITUTE, Daejeon (KR)

(72) Inventors: Chang-Sic Choi, Daejeon (KR); Tai-Yeon Ku, Daejeon (KR); Wan Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 434 days.

(21) Appl. No.: 18/397,003

(22) Filed: Dec. 27, 2023

(65) Prior Publication Data

US 2024/0220351 A1 Jul. 4, 2024

(30) Foreign Application Priority Data

Jan. 2, 2023 (KR) ........................ 10-2023-0000409

(51) Int. Cl.
*G06F 11/07* (2006.01)
*G06F 11/30* (2006.01)
*G06F 11/32* (2006.01)

(52) U.S. Cl.
CPC ........ *G06F 11/079* (2013.01); *G06F 11/3072* (2013.01); *G06F 11/327* (2013.01)

(58) Field of Classification Search
CPC .................. G05B 23/0259; G05B 2219/31337
See application file for complete search history.

(56) References Cited

U.S. PATENT DOCUMENTS

2012/0166363 A1* 6/2012 He ....................... G06N 3/0409 706/2
2013/0098428 A1 4/2013 Yun et al.
2014/0188571 A1 7/2014 Han et al.
2021/0262689 A1* 8/2021 Shinde ................... G06Q 50/06
(Continued)

FOREIGN PATENT DOCUMENTS

KR 10-2013-0020857 A 3/2013
KR 10-1323999 B1 11/2013
(Continued)

OTHER PUBLICATIONS

Tai-Yeon Ku et al., "Collection and correction of residential thermal energy data using time series data processing techniques", KICS conference, Dec. 31, 2022.

*Primary Examiner* — Nathan L Laughlin
(74) *Attorney, Agent, or Firm* — LRK PATENT LAW FIRM

(57) ABSTRACT

An event management method based on thermal energy data is disclosed. The event management method generates profiles in real time for a single error, a composite error, and a history error, respectively, and detects, from the respective generated profiles, an error in thermal energy data that may occur at every stage of thermal energy data supply, distribution, and consumption to manage an event to execute measures in response to the detected error in the thermal energy data.

18 Claims, 5 Drawing Sheets

(56) References Cited

U.S. PATENT DOCUMENTS

| | | | | |
|---|---|---|---|---|
| 2021/0325069 | A1* | 10/2021 | Cotton | F24D 11/0207 |
| 2022/0299963 | A1* | 9/2022 | Waghmare | G05B 19/042 |
| 2024/0167728 | A1* | 5/2024 | Nishimura | F24D 19/1081 |

FOREIGN PATENT DOCUMENTS

| | | | |
|---|---|---|---|
| KR | 10-2014-0122010 | A | 10/2014 |
| KR | 10-2017-0122027 | A | 11/2017 |
| KR | 10-2018-0098181 | A | 9/2018 |
| KR | 10-2286272 | B1 | 8/2021 |
| KR | 10-2021-0117946 | A | 9/2021 |
| KR | 10-2022-0100252 | A | 7/2022 |

* cited by examiner

EVENT MANAGEMENT METHOD USING THERMAL DATA AND COMPUTING APPARATUS FOR PERFORMING THE SAME

CROSS-REFERENCE TO RELATED APPLICATION

This application claims the benefit of Korean Patent Application No. 10-2023-0000409 filed on Jan. 2, 2023, in the Korean Intellectual Property Office, the entire disclosure of which is incorporated herein by reference for all purposes.

BACKGROUND

1. Field of the Invention

One or more embodiments relate to an event management method, and more particularly, to an apparatus and method of identifying an abnormal state caused by an error in thermal energy data collected throughout the entire heating and hot water system and transmitting an event to execute appropriate countermeasures.

2. Description of Related Art

Generally, thermal energy is widely used in residential areas where residential complexes are densely located due to the characteristics of thermal energy, including thermal loss during transportation and the constrained applicability of thermal energy. Recently, with the widespread use of five integrated metering facilities in residential complexes, there has been a shift from traditional manual monthly readings to automated real-time energy meter information collection. Various management techniques and services utilizing this advancement are anticipated in the future.

Furthermore, thermal energy is associated with complex facilities and instruments at various stages such as transportation, distribution, and consumption in the production and supply of thermal energy. The efficiency of the overall management plays a crucial role in determining the profitability and convenience of thermal energy businesses. In addition, ensuring reasonable and accurate billing requires attention to the security and analysis of thermal energy data.

In particular, there is a growing demand for technology that promptly detects, tracks, and analyzes errors in thermal energy data to address issues related to unfair billing and various thermal losses and efficiencies in thermal energy usage.

SUMMARY

Embodiments provide a method of collecting and analyzing thermal energy data generated throughout all stages, from a supply stage to transmission, distribution, and consumption stages, and transmitting analysis results to each stage in order to utilize thermal energy more efficiently and fairly, thereby increasing the reliability of thermal energy data across a complete cycle of thermal energy and facilitating efficient handling and management.

Embodiments provide a method of detecting and analyzing an error in thermal energy data, converting an analysis result into an event, and transmitting the event to a supply facility, a complex facility, and an accommodation facility for thermal energy data.

Embodiments provide a method of detecting an error that may occur in thermal energy data of each facility in real time to secure the reliability of thermal energy data by detecting an error pattern that may be maliciously manipulated.

Embodiments provide a method of notifying a manager of each facility of analyzed error results of thermal energy data, facilitating maintenance of each facility and meter, thereby contributing to the stability and efficient operational services of thermal energy.

According to an aspect, there is provided an event management method including generating an error detection profile of each of thermal energy data of a supply facility, thermal energy data of a complex facility, and thermal energy data of an accommodation facility by analyzing at least one of the thermal energy data of the supply facility, the thermal energy data of the complex facility, and the thermal energy data of the accommodation facility, generating a history error profile and a composite error profile from the error detection profile related to each of the supply facility, the complex facility, and the accommodation facility, determining whether an error occurs in thermal energy data collected from each of the supply facility, the complex facility, and the accommodation facility using the error detection profile related to each of the supply facility, the complex facility, and the accommodation facility, when an error occurs in the thermal energy data, detecting a type of the error occurring in the thermal energy data based on the history error profile and the composite error profile, based on a result of detecting the type of the error, determining a managed site of the thermal energy data in which the error occurs, and transmitting an event, comprised in the type of the error occurring in the thermal energy data, to the determined managed site as an alarm.

The generating of the error detection profile may include generating an error detection profile required to analyze metadata of the thermal energy data collected from each of the supply facility, the complex facility, and the accommodation facility and identify an error in the thermal energy data.

The generating of the history error profile and the composite error profile may include analyzing metadata of the error detection profile based on an error condition provided by each of the supply facility, the complex facility, and the accommodation facility to determine a continuous pattern of the analyzed metadata and generating a history error profile using the determined continuous pattern of the metadata.

The generating of the history error profile and the composite error profile may include generating a composite error profile based on at least one of a single linkage or multiple linkages related to the thermal energy data using the error detection profile.

The detecting of the type of the error occurring in the thermal energy data may include determining a similarity between metadata of the history error profile and metadata of thermal energy in which an error occurs by comparing the metadata of the history error profile with the metadata of the thermal energy and when there is a similarity between the metadata of the history error profile and the metadata of the thermal energy, determining a type of the error occurring in the thermal energy data to be a history error.

The detecting of the type of the error occurring in the thermal energy data may include determining a similarity between metadata of the composite error profile and metadata of thermal energy in which an error occurs by comparing the metadata of the composite error profile with the metadata of the thermal energy and when there is a similarity between the metadata of the composite error profile and the metadata of the thermal energy, determining a type of the error occurring in the thermal energy data to be a composite error.

The determining of the managed site of the thermal energy data may include determining a managed site for error notification among the supply facility, the complex facility, and the accommodation facility using identification information of the thermal energy data in which the error occurs.

According to another aspect, there is provided an event management method including collecting thermal energy data from each of a supply facility, a complex facility, and an accommodation facility, each performing a complete cycle of thermal energy supply, distribution, and consumption, verifying whether a valid value of each of the collected thermal energy data falls within a valid data range based on an error detection profile, when the valid value does not fall within the valid data range, detecting a type of an error occurring in the thermal energy data based on a history error profile and a composite error profile, and determining a managed site of the thermal energy data in which the error occurs to transmit an event comprised in the type of the error to the determined site as an alarm.

The detecting of the type of the error occurring in the thermal energy data may include determining a similarity between metadata of the history error profile and metadata of thermal energy in which an error occurs by comparing the metadata of the history error profile with the metadata of the thermal energy and when there is a similarity between the metadata of the history error profile and the metadata of the thermal energy, determining a type of the error occurring in the thermal energy data to be a history error.

The detecting of the type of the error occurring in the thermal energy data may include determining a similarity between metadata of the composite error profile and metadata of thermal energy in which an error occurs by comparing the metadata of the composite error profile with the metadata of the thermal energy and when there is a similarity between the metadata of the composite error profile and the metadata of the thermal energy, determining a type of the error occurring in the thermal energy data to be a composite error.

The error detection profile may include predetermined information required to identify the error in the thermal energy data, the history error profile may include information obtained by analyzing metadata of the error detection profile, wherein the information is presented in a continuous pattern of the metadata, and the composite error profile may include information indicating a single linkage or multiple linkages related to the thermal energy data using the error detection profile.

According to another aspect, there is provided a computing apparatus for performing an event management method, the computing apparatus including a processor, wherein the processor may be configured to generate an error detection profile of each of thermal energy data of a supply facility, thermal energy data of a complex facility, and thermal energy data of an accommodation facility by analyzing at least one of the thermal energy data of the supply facility, the thermal energy data of the complex facility, and the thermal energy data of the accommodation facility, generate a history error profile and a composite error profile from the error detection profile related to each of the supply facility, the complex facility, and the accommodation facility, determine whether an error occurs in thermal energy data collected from each of the supply facility, the complex facility, and the accommodation facility using the error detection profile related to each of the supply facility, the complex facility, and the accommodation facility, when an error occurs in the thermal energy data, detect a type of the error occurring in the thermal energy data based on the history error profile and the composite error profile, based on a result of detecting the type of the error, determine a managed site of the thermal energy data in which the error occurs, and transmit an event, comprised in the type of the error occurring in the thermal energy data, to the determined managed site as an alarm.

The processor may be configured to generate an error detection profile required to analyze metadata of the thermal energy data collected from each of the supply facility, the complex facility, and the accommodation facility and identify an error in the thermal energy data.

The processor may be configured to analyze metadata of the error detection profile based on an error condition provided by each of the supply facility, the complex facility, and the accommodation facility to determine a continuous pattern of the analyzed metadata and generate a history error profile using the determined continuous pattern of the metadata.

The processor may be configured to generate a composite error profile based on at least one of a single linkage or multiple linkages related to the thermal energy data using the error detection profile.

The processor may be configured to determine a similarity between metadata of the history error profile and metadata of thermal energy in which an error occurs by comparing the metadata of the history error profile with the metadata of the thermal energy and when there is a similarity between the metadata of the history error profile and the metadata of the thermal energy, determine a type of the error occurring in the thermal energy data to be a history error.

The processor may be configured to determine a similarity between metadata of the composite error profile and metadata of thermal energy in which an error occurs by comparing the metadata of the history error profile with the metadata of the thermal energy and when there is a similarity between the metadata of the history error profile and the metadata of the thermal energy, determine a type of the error occurring in the thermal energy data to be a composite error.

The processor may be configured to determine a managed site for error notification among a supply facility, a complex facility, and an accommodation facility using identification information of the thermal energy data in which the error occurs.

Additional aspects of embodiments will be set forth in part in the description which follows and, in part, will be apparent from the description, or may be learned by practice of the disclosure.

According to an embodiment, an event management method may collect and analyze thermal energy data generated throughout all stages, from a supply stage to transmission, distribution, and consumption stages, thereby increasing the reliability of thermal energy data across a complete cycle of thermal energy and facilitating efficient handling and management.

According to an embodiment, the event management method may classify profiles of thermal energy data generated throughout a complete cycle of thermal energy supply, distribution, and consumption to define a type of an error, thereby classifying thermal energy data collected in real time into abnormal data and normal data and processing the collected thermal energy data.

According to an embodiment, the event management method may support real-time rapid detection and alarm processing as abnormal data is generated, enabling efficient management of maintenance and thermal energy operation due to a complex error or a history error.

According to an embodiment, the event management method may perform error detection on thermal energy data for continuous and diverse situations, enabling transparent billing through detection of an unfair error in thermal data and improving efficiency in immediate maintenance and thermal energy supply and distribution.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments will be described in detail with reference to the accompanying drawings.

Figure 1:
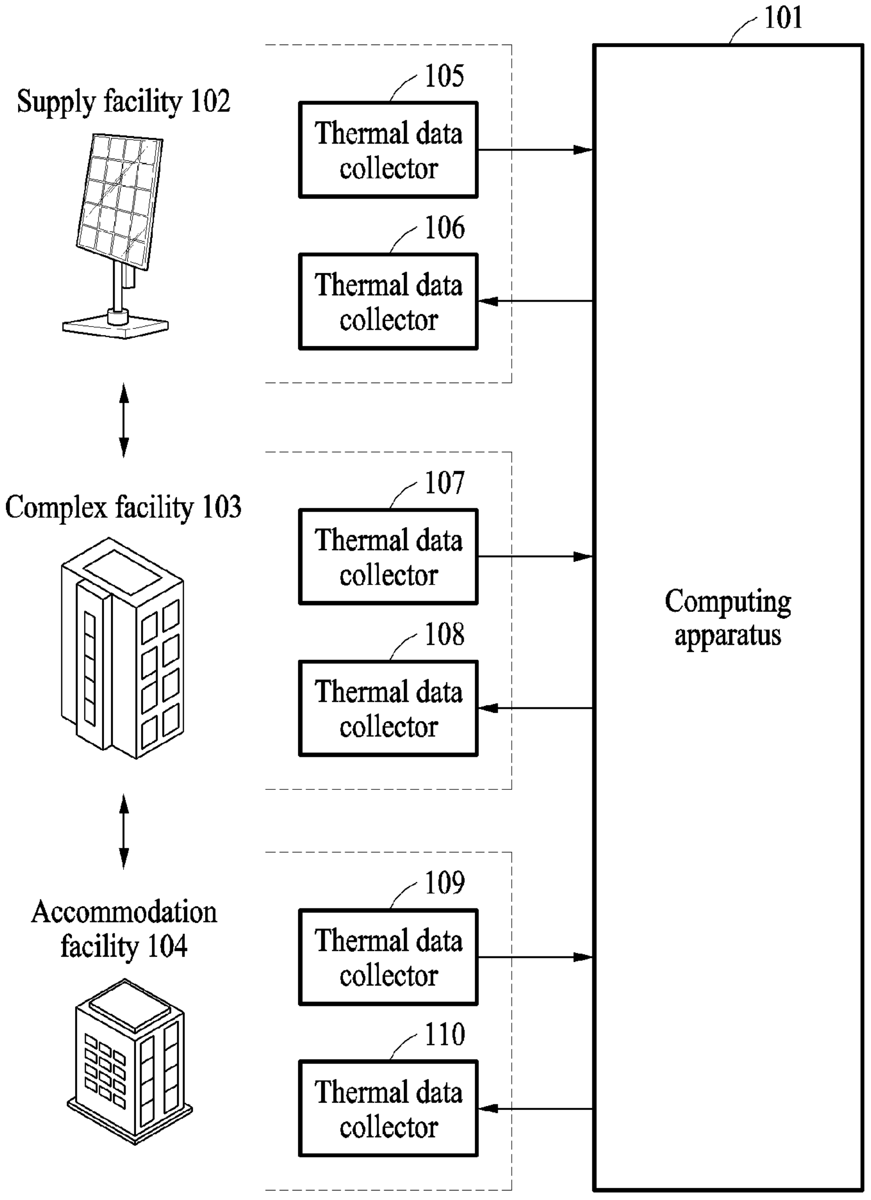
FIG. 1 is a diagram illustrating an overall system for detecting and managing an error in thermal energy, according to an embodiment.

FIG. 1 is a diagram illustrating an overall system for detecting and managing an error in thermal energy, according to an embodiment.

Referring to FIG. 1, a computing apparatus 101 may collect thermal energy data of each of a supply facility 102, a complex facility 103, and an accommodation facility 104 from thermal data collectors 105, 107, and 109 respectively interworking with the supply facility 102, the complex facility 103, and the accommodation facility 104. The computing apparatus 101 may generate an error detection profile by analyzing metadata of the thermal energy data of each of the facilities collected from the thermal data collectors 105, 107, and 109. The error detection profile may be information required to identify an error in thermal energy data.

The computing apparatus 101 may generate a history error profile and a composite error profile related to the type of an error using the error detection profile of each piece of thermal energy data. The computing apparatus 101 may determine whether an error occurs in the thermal energy data collected from each of the facilities using the error detection profile for each of the facilities. When an error occurs in the thermal energy data, the computing apparatus 101 may detect the type of the error occurring in the thermal energy data based on the history error profile and the composite error profile.

The computing apparatus 101 may determine a managed site of the thermal energy data in which the error occurs based on the result of detecting the type of the error. The computing apparatus 101 may transmit an event included in the type of the error occurring in the thermal energy data to the determined managed site as an alarm. In order to respond more quickly to emergency situations caused by the error in the thermal energy data, the computing apparatus 101 may provide an event analysis result related to the error to a thermal energy supply manager 106 interworking with the supply facility 102, a thermal energy complex manager 108 interworking with the complex facility 103, and a thermal energy accommodation manager 110 interworking with the accommodation facility 104.

Therefore, the computing apparatus 101 described in the present disclosure may identify a single error caused by a single piece of data, a composite error caused by a history and multiple data linkages, and the like by analyzing thermal energy data generated at every stage of thermal energy supply, transmission, distribution, and consumption in real time. The computing apparatus 101 may determine and respond to an abnormal state of each of the facilities in real time in terms of security considerations throughout the operational process of thermal energy by analyzing an error in thermal energy data and transmitting an event analysis result related to the error to each managed site.

Figure 2:
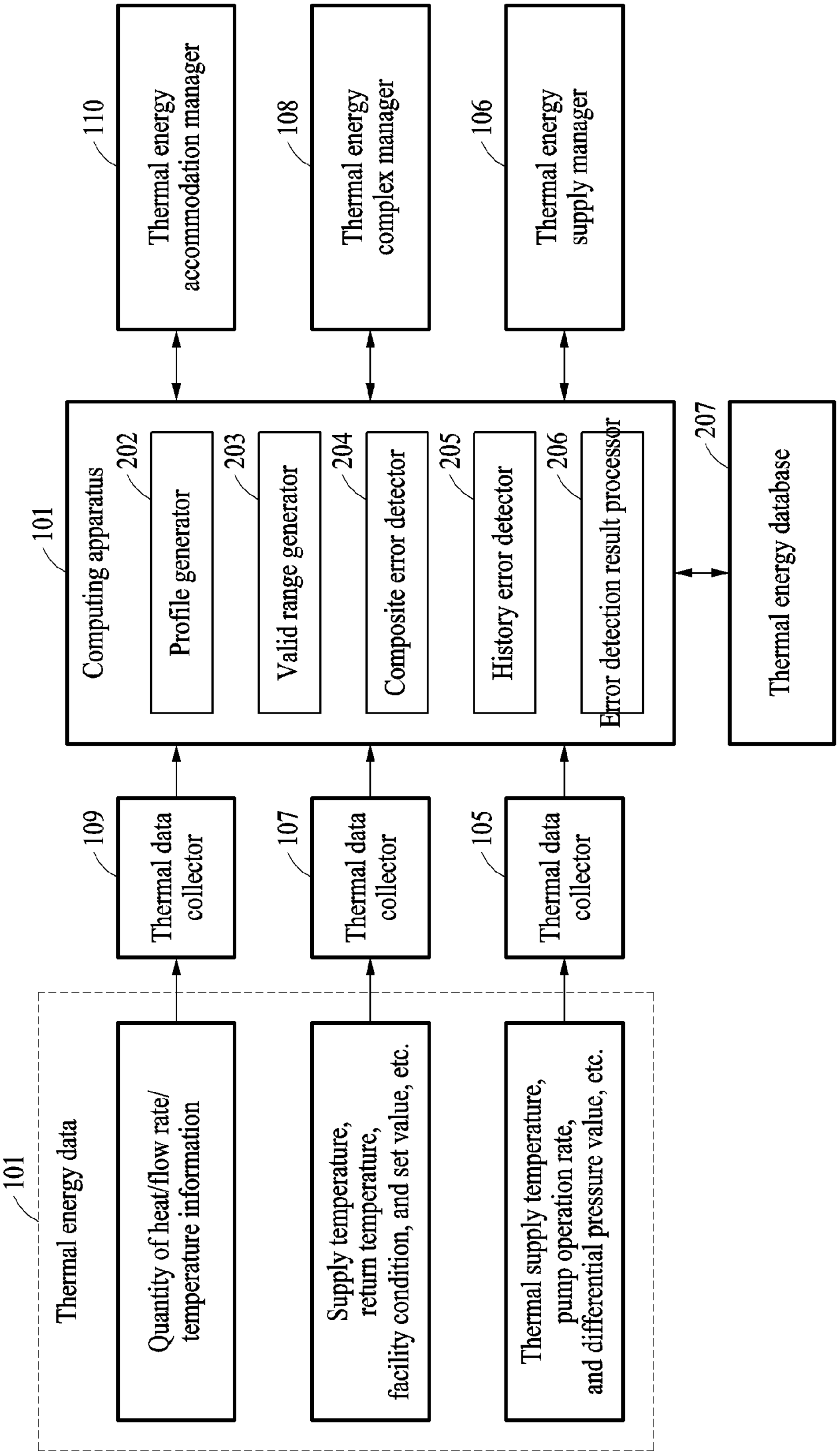
FIG. 2 is a diagram illustrating an overall operation of a computing apparatus for managing an event related to thermal energy, according to an embodiment.

FIG. 2 is a diagram illustrating an overall operation of a computing apparatus for managing an event related to thermal energy, according to an embodiment.

Referring to FIG. 2, the computing apparatus 101 may collect thermal energy data 201 at each stage of a supply facility, a complex facility, and an accommodation facility in relation to thermal energy. The computing apparatus 101 may detect an error occurring in the thermal energy data 201 considering correlation between data based on the time at which the thermal energy data 201 is collected from each of the facilities. The computing apparatus 101 may utilize the thermal data collectors 105, 107, and 109 respectively interworking with the facilities to collect the thermal energy data 201 at each stage. The thermal data collectors 105, 107, and 109 may collect thermal energy data utilized at each of the facilities in the cycle of thermal energy, spanning all stages from a supply stage to transmission, distribution, and consumption stages.

The thermal data collector 105 interworking with the supply facility may collect thermal energy data including at least one of quantity of heat, flow rate, and temperature in relation to the supply of thermal energy produced by the supply facility. The thermal energy data collected from the supply facility may be collected from various apparatuses installed at a business that produces and supplies thermal energy and may be utilized to ensure cost-effectiveness and perform seamless maintenance.

The thermal data collector 107 interworking with the complex facility may collect thermal energy data including at least one of supply temperature, return temperature, facility condition, and set value in relation to the distribution and transmission of the thermal energy transmitted from the supply facility. The thermal energy data collected from the complex facility is data transmitted from various devices related to the complex facility for distributing and managing thermal energy in a residential complex and may be utilized to manage thermal energy in the residential complex.

The thermal data collector 109 interworking with the accommodation facility may collect thermal energy data including at least one of thermal supply temperature, pump operation rate, and differential pressure value in relation to the consumption of the thermal energy distributed from the complex facility. The thermal energy data collected from the accommodation facility is data generated from the meter of a consumer, an end user of thermal energy residing in a residential complex and may be utilized as billing data.

The thermal data collectors 105, 107, and 109 may be apparatuses for collecting thermal energy data from at least one of the supply facility, the complex facility, and the accommodation facility and transmitting the thermal energy data to the computing apparatus 101. The thermal data collectors 105, 107, and 109 may mainly operate in conjunction with a meter-reading server and individual apparatuses at a corresponding site and communicate with a remote server through an Internet network.

The computing apparatus 101 may be implemented mainly on a remote server and operate in conjunction with a thermal energy database 207. The thermal energy database 207 may store valid thermal energy data, and the stored thermal energy data may be utilized for services such as monitoring and billing.

Furthermore, the computing apparatus 101, by collecting thermal energy data processed at each of the facilities step-by-step, may classify and define thermal energy data generated at all stages as a single error, a composite error, and a history error to detect an error pattern caused by malicious manipulation at each stage in real time.

In detail, the computing apparatus 101 may include a profile generator 202, a valid range generator 203, a composite error detector 204, a history error detector 205, and an error detection result processor 206. Each operation is described in detail with reference to FIGS. 3 and 4. Thereafter, the computing apparatus 101 may undergo each stage and register thermal energy data to be monitored, the profile of the thermal energy data, and the type of an error. When an error occurs in thermal energy data, the computing apparatus 101 may transmit an event related to the error to thermal energy demand managers 106, 108, and 110. The thermal energy demand managers 106, 108, and 110 may assist in executing maintenance on a facility with an error according to an event transmitted from the computing apparatus 101.

Figure 3:
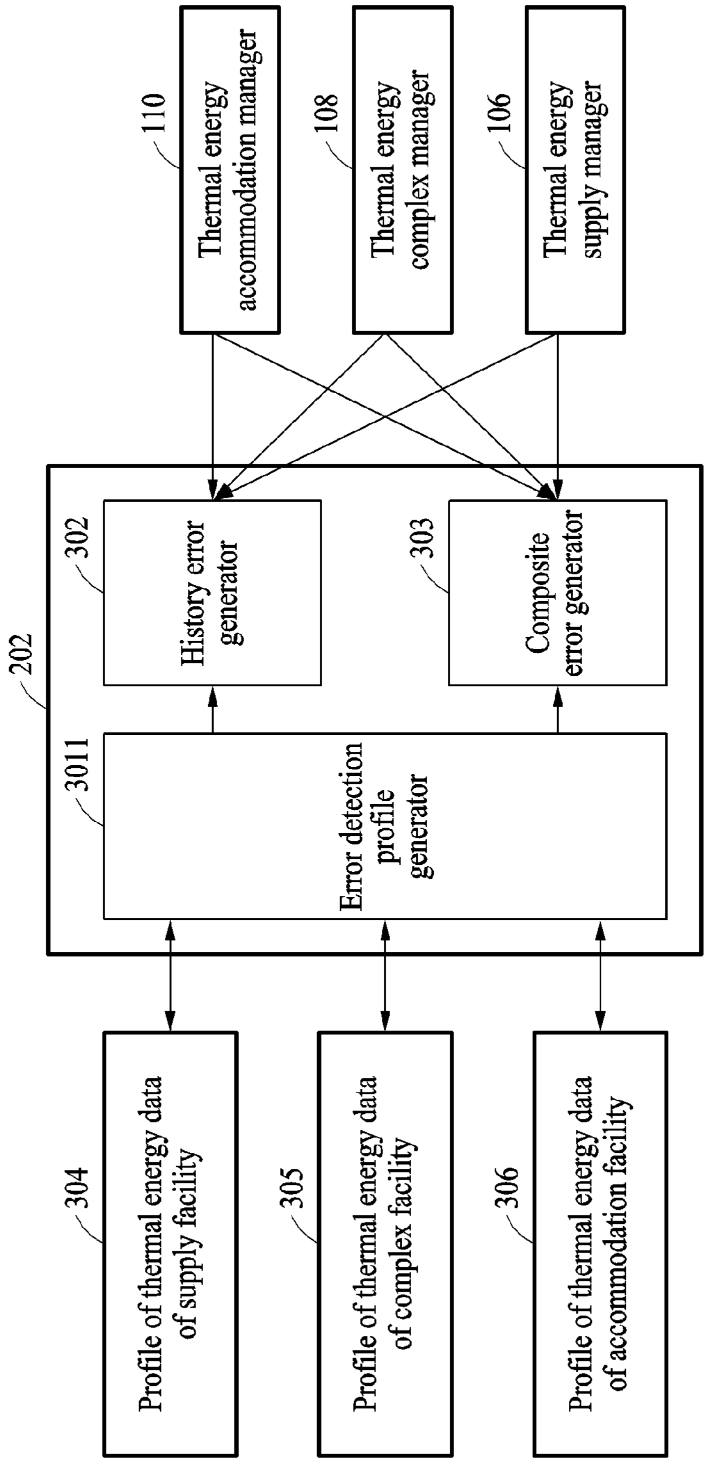
FIG. 3 is a diagram illustrating a process of generating a profile for detecting an error in thermal energy, according to an embodiment.

FIG. 3 is a diagram illustrating a process of generating a profile for detecting an error in thermal energy, according to an embodiment.

Referring to FIG. 3, a computing apparatus may include a profile generator 202 for detecting an error in thermal energy data. The profile generator 202 may include an error detection profile generator 301, a history error generator 302, and a composite error generator 303.

The error detection profile generator 301 may generate an error detection profile of thermal energy data for each of a supply facility, a complex facility, and an accommodation facility using a profile 304 of thermal energy data related to the supply facility, a profile 305 of thermal energy data related to the complex facility, and a profile 306 of thermal energy data related to the accommodation facility. The profiles 304, 305, and 306 of the thermal energy data may each include metadata about an identifier, a valid value range, a data characteristic, and the like, for each collected thermal energy data.

When collecting thermal energy data, the error detection profile generator 301 may analyze corresponding thermal energy data in real time to generate an error detection profile required to identify an error and missing information in the data. The error detection profile generator 301 may define thermal energy data as individual data and may generate individual defined error detection profiles.

The history error generator 302 may analyze metadata of an error detection profile based on an error condition provided by each of the facilities to determine a continuous pattern of the metadata. The history error generator 302 may generate a history error profile using the determined continuous pattern of the metadata. In detail, the history error generator 302 may generate a history error profile by analyzing an error in a continuous data pattern by reflecting error detection information for individual data from the error detection profile generator 301 in real time and requirements for time-series error detection from the thermal energy supply manager 106, the thermal energy complex manager 108, and the thermal energy accommodation manager 110.

The composite error generator 303 may generate a composite error profile for thermal energy data based on a single linkage or multiple linkages using an error detection profile. In other words, the composite error generator 303 may generate a composite error profile similarly to the way a history error is generated by accommodating abnormal data and requirements of each of the thermal energy supply manager 106, the thermal energy complex manager 108, and the thermal energy accommodation manager 110 or analyzing a potential error that may occur when a plurality of pieces of data is associated together.

A history error profile generated by the history error generator 302 and a composite error profile generated by the composite error generator 303 may operate in a post-processing manner in connection with a database rather than operating in real time.

Figure 4:
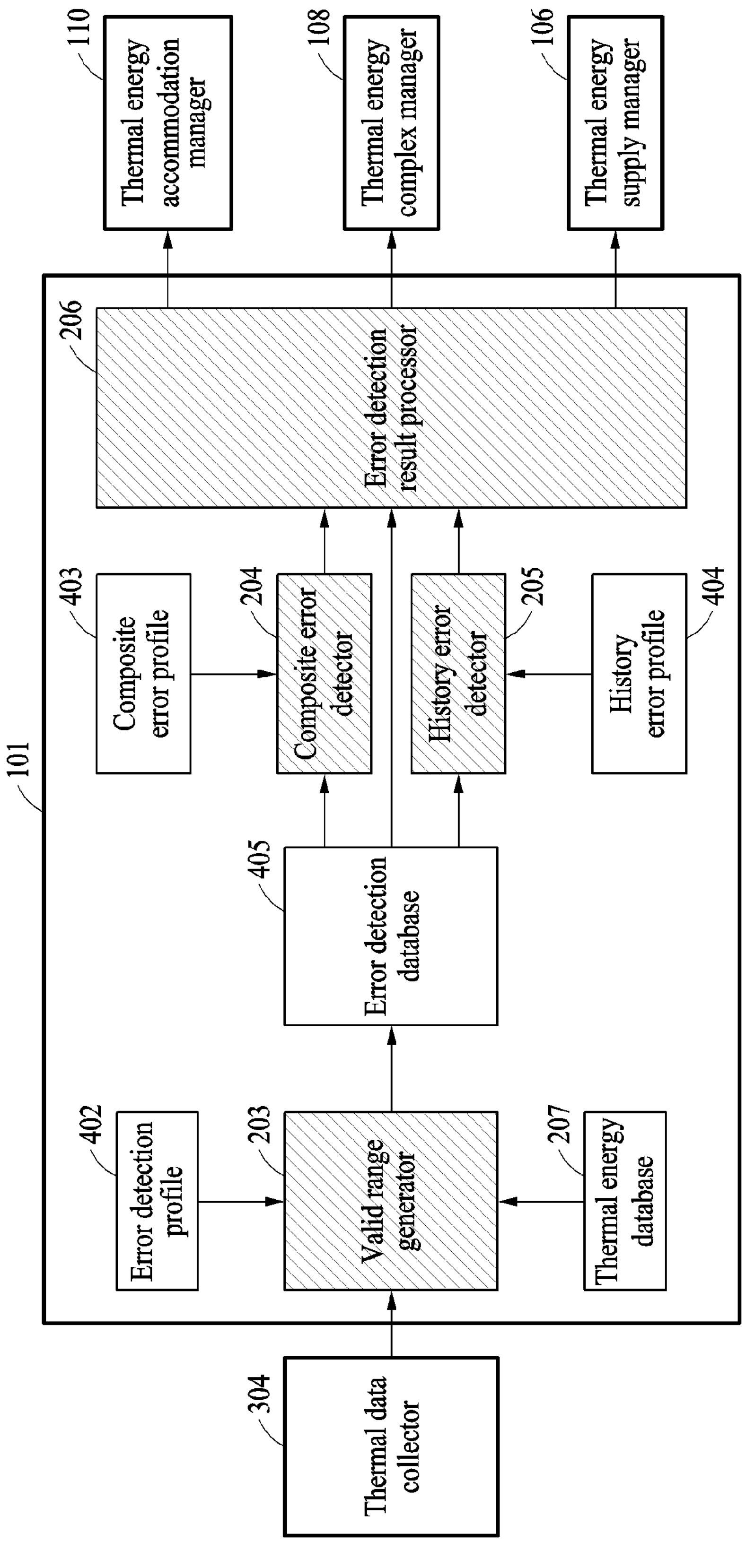
FIG. 4 is a diagram illustrating a detailed operation of detecting an error in thermal energy using a profile, according to an embodiment.

FIG. 4 is a diagram illustrating a detailed operation of detecting an error in thermal energy using a profile, according to an embodiment.

Referring to FIG. 4, the computing apparatus 101 may detect a substantial error in thermal energy data using an error detection profile 402, a composite error profile 403, and a history error profile 404 in FIG. 3.

A thermal data collector 401 may collect thermal energy data from various facilities, apparatuses, and meters operating all areas of supply, distribution, and consumption of thermal energy. The thermal data collector 401 may transmit the collected thermal energy data to the computing apparatus 101 serving as a server. The computing apparatus 101 may include the valid range generator 203, the composite error detector 204, the history error detector 205, and the error detection result processor 206.

The valid range detector 203 may determine whether the valid value of the collected thermal energy data falls within a data valid range in real time. The valid range detector 203 may determine whether the collected thermal energy data is normal data or abnormal data with reference to the error detection profile 402. When the collected thermal energy data corresponds to normal data, the valid range detector 203 may store the thermal energy data in the thermal energy database 207 and may manage the data such that the data may be utilized for further billing and operations. When the collected thermal energy data corresponds to abnormal data, the valid range detector 203 may separately store the collected thermal energy data in an error detection database 405.

The composite error detector 204 may detect a composite error by simultaneously comparing a plurality of pieces of highly correlated data when detecting an error among abnormal data stored in the error detection database 405 with reference to the composite error profile 403 based on multiple data linkages. In other words, the composite error detector 204 may determine a similarity between the metadata of a composite error profile and the metadata of thermal energy in which an error occurs by comparing the metadata of the composite error profile with the metadata of the thermal energy When there is a similarity between the metadata of the composite error profile and the metadata of the thermal energy, the composite error detector 204 may determine the type of the error occurring in the thermal energy to be a composite error.

The history error detector 205 may identify a time-series error in a single piece of data among abnormal data stored in the error detection database 405 with reference to the history error profile 404. In detail, the history error detector 205 may determine a similarity between the metadata of the history error profile and the metadata of the thermal energy in which an error occurs by comparing the metadata of the history error profile with the metadata of the thermal energy. When there is a similarity between the metadata of the history error profile and the metadata of the thermal energy, the history error detector 205 may determine the type of the error occurring in the thermal energy data to be a history error.

The error detection result processor 206 may transmit error results respectively detected through the composite error detector 204 and the history error detector 205 to the thermal energy supply manager 106, the thermal energy complex manager 108, and the thermal energy accommodation manager 110. The thermal energy supply manager 106, the thermal energy complex manager 108, and the thermal energy accommodation manager 110 may receive an error analysis result value for thermal energy data from the computing apparatus 101. The thermal energy supply manager 106, the thermal energy complex manager 108, and the thermal energy accommodation manager 110 may perform maintenance tasks or notify a manager or consumer of corresponding information using the error analysis result value, thereby easily ensuring fairness in thermal loss and billing, while also increasing the capability to monitor external security risks.

Figure 5:
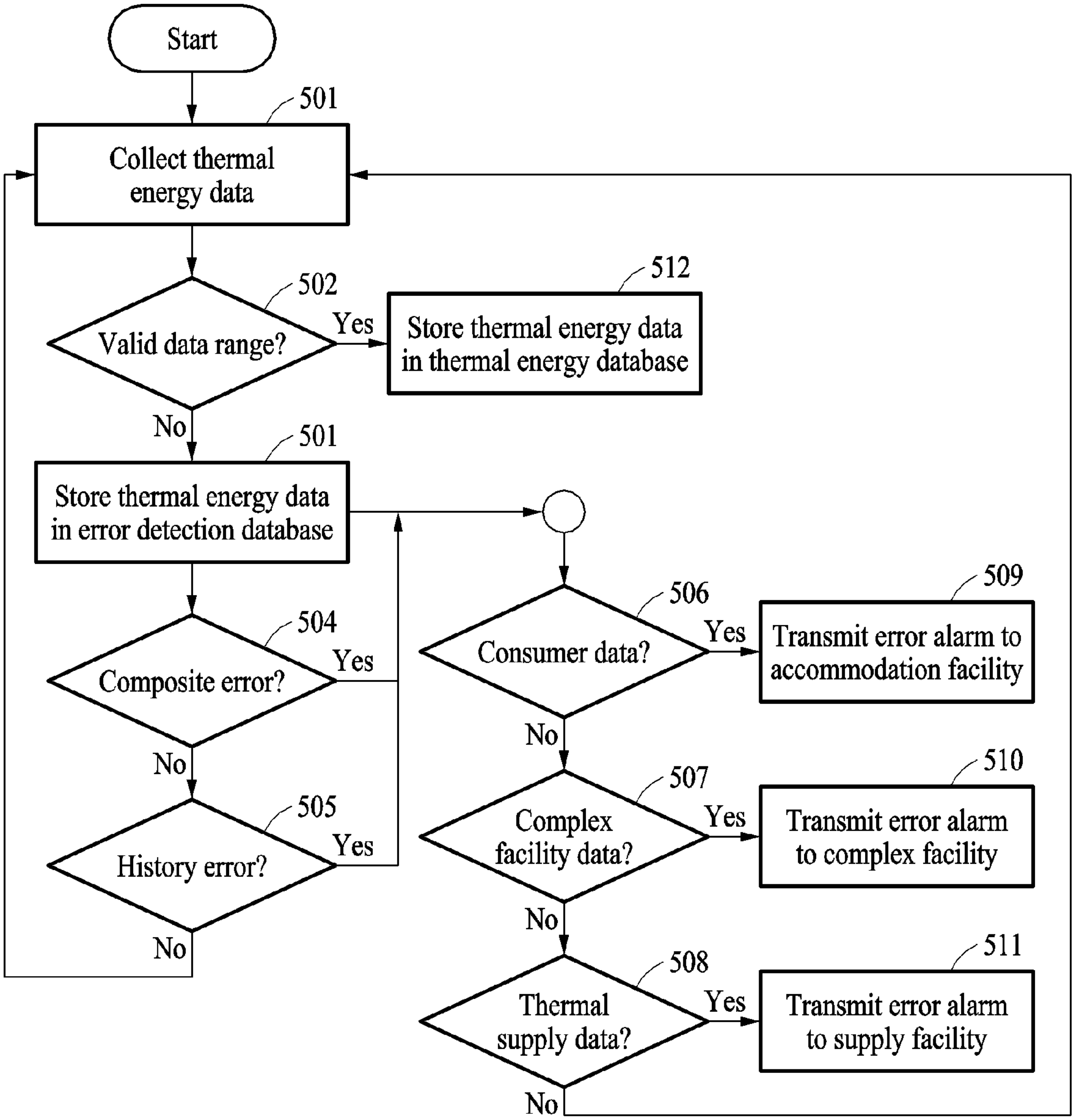
FIG. 5 is a flowchart illustrating an event management method based on error detection, according to an embodiment.

FIG. 5 is a flowchart illustrating an event management method based on error detection, according to an embodiment.

FIG. 5 illustrates a flowchart describing a sequence of operations involved in detecting an error in thermal energy data described with reference to FIGS. 3 and 4.

In operation 501, a computing apparatus may collect thermal energy data of an accommodation facility, thermal energy data of a complex facility, and thermal energy data of a supply facility from thermal data collectors respectively interworking with the facilities. The computing apparatus may perform a task of analyzing a profile of thermal energy data collected from each of the facilities. The computing apparatus may perform a task of generating and analyzing an error detection profile related to a single error, a composite error profile based on a plurality of pieces of thermal energy data, and a history error profile over time from the thermal energy data collected from each of the facilities.

In operation 502, the computing apparatus may determine whether thermal energy data corresponding to each profile generated for a single error, a composite error, and a history error falls within a valid range. When the thermal energy data falls within the valid range (Yes in operation 502), the computing apparatus may store the thermal energy data in a thermal energy database in operation 512. The computing apparatus may determine that the thermal energy data stored in the thermal energy database is normal data.

When the thermal energy data does not fall within the valid range (No in operation 502), the computing apparatus may store the thermal energy data in an error detection database in operation 503. The computing apparatus may determine the thermal energy data stored in the error detection database to be abnormal data. The computing apparatus may determine a managed site for thermal energy data in which an error occurs.

In operation 504, the computing apparatus may determine whether a composite error occurs in the thermal energy data stored in the error detection database through operation 503. In other words, the computing apparatus may determine whether an error associated with a plurality of pieces of thermal energy data is detected in the thermal energy data, that is, abnormal data, stored in the error detection database. Here, a composite error may be defined as a critical error in operations related to functions and services at every stage of the supply, distribution, and consumption of thermal energy data. The computing apparatus may determine the type of the error occurring in the thermal energy data to be a composite error by considering a detected error result.

When the error is determined to be the composite error (Yes in operation 504), the computing apparatus may determine a managed site of the thermal energy data in which the error occurs.

When the error is not determined to be the composite error (No in operation 504), in operation 505, the computing apparatus may determine whether a history error occurs in the thermal energy data stored in the error detection database through operation 503. In other words, the computing apparatus may determine whether a persistent error is detected by determining whether a time-series error occurs in the thermal energy data, that is, abnormal data, stored in the error detection database. Here, the computing apparatus may identify a persistent error to perform immediate maintenance for the persistent error.

The computing apparatus may determine the type of the error occurring in the thermal energy data to be a history error by considering the detected error result.

When the error is determined to be the history error (Yes in operation 505), the computing apparatus may determine a managed site of the thermal energy data in which the error occurs.

When the error is not determined to be the history error (No in operation 505), the computing apparatus may proceed to operation 201 to collect thermal energy data of the accommodation facility, thermal energy data of the complex facility, and thermal energy data of the supply facility from the thermal data collectors.

In operation 506, the computing apparatus may determine whether the thermal energy data for which the type of the error is determined is data collected from the accommodation facility. When the thermal energy data is collected from the accommodation facility (Yes in operation 506), the accommodation facility may be determined to be the managed site of the thermal energy data. In operation 509, the computing apparatus may transmit an error alarm to the accommodation facility determined to be the managed site.

When the thermal energy data is not collected from the accommodation facility (No in operation 506), in operation 507, the computing apparatus may determine whether the thermal energy data for which the type of the error is determined is data collected from the complex facility. When the thermal energy data is collected from the complex facility (Yes in operation 507), the computing apparatus may determine the complex facility to be the managed site of the thermal energy data. In operation 510, the computing apparatus may transmit an error alarm to the complex facility determined to be the managed site.

When the thermal energy data is not collected from the complex facility (No in operation 507), in operation 508, the computing apparatus may determine whether the thermal energy data for which the type of the error is determined is data collected from the supply facility. When the thermal energy data is collected from the supply facility (Yes in operation 508), the computing apparatus may determine the supply facility to be the managed site of the thermal energy data. In operation 511, the computing apparatus may transmit an error alarm to the supply facility determined to be the managed site.

When the thermal energy data is not collected from the supply facility (No in operation 508), the computing apparatus may proceed to operation 201 to collect the thermal energy data of the accommodation facility, the thermal energy data of the complex facility, and the thermal energy data of the supply facility from the thermal data collectors.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (a computer-readable medium) or in a propagated signal, for processing by, or to control an operation of, a data processing device, for example, a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor may receive instructions and data from a read-only memory (ROM) or a random access memory (RAM), or both. Elements of a computer may include at least one processor for executing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, for example, magnetic media such as hard disks, floppy disks, and magnetic tape, optical media such as compact disc ROM (CD-ROM) or digital video discs (DVDs), magneto-optical media such as floptical disks, ROM, RAM, flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

While the present specification contains many specific implementation details, these should not be construed as limitations on the scope of any disclosure or of what may be claimed, but rather as descriptions of features that may be specific to particular embodiments of particular disclosures. Specific features described in the present specification in the context of individual embodiments may be combined and implemented in a single embodiment. On the contrary, various features described in the context of a single embodiment may be implemented in a plurality of embodiments individually or in any appropriate sub-combination. Moreover, although features may be described above as acting in specific combinations and even initially claimed as such, one or more features from a claimed combination may in some cases be excluded from the combination, and the claimed combination may be changed to a sub-combination or a modification of a sub-combination.

Likewise, although operations are depicted in a predetermined order in the drawings, it should not be construed that the operations need to be performed sequentially or in the predetermined order, which is illustrated to obtain a desirable result, or that all of the shown operations need to be performed. In specific cases, multi-tasking and parallel processing may be advantageous. In addition, it should not be construed that the separation of various device components of the aforementioned embodiments is required in all types of embodiments, and it should be understood that the described program components and devices are generally integrated as a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, may be made.

What is claimed is:

1. An event management method comprising:

collecting, by a computing apparatus and from thermal data collectors respectively interworking with a supply facility, a complex facility, and an accommodation facility, thermal energy data of the supply facility, thermal energy data of the complex facility, and thermal energy data of the accommodation facility, wherein the thermal energy data of the supply facility includes data associated with supply of thermal energy, the thermal energy data of the complex facility includes data associated with distribution or transmission of the thermal energy, and the thermal energy data of the accommodation facility includes data associated with consumption of the thermal energy;

generating, by the computing apparatus, an error detection profile for each of the collected thermal energy data of the supply facility, the collected thermal energy data of the complex facility, and the collected thermal energy data of the accommodation facility by analyzing the collected thermal energy data, wherein each error detection profile includes metadata comprising an identifier, a valid value range, and a data characteristic for corresponding collected thermal energy data;

generating, by the computing apparatus, a history error profile from the error detection profile by determining a continuous time-series pattern of the metadata based on an error condition associated with at least one of the supply facility, the complex facility, and the accommodation facility;

generating, by the computing apparatus, a composite error profile from the error detection profile based on a single linkage or multiple linkages among a plurality of items of the collected thermal energy data;

determining, by the computing apparatus, whether an error occurs in the collected thermal energy data using the valid value range included in a corresponding error detection profile;

when the error occurs in the collected thermal energy data, detecting, by the computing apparatus, whether a type of the error is a history error or a composite error based on the history error profile and the composite error profile;

based on a result of detecting the type of the error, determining, by the computing apparatus, a managed site among the supply facility, the complex facility, and the accommodation facility using identification information included in the metadata of the collected thermal energy data in which the error occurs; and transmitting, by the computing apparatus, to the determined managed site an event comprised of the detected type of the error as an alarm.

2. The event management method of claim 1, wherein the generating of the error detection profile comprises generating each error detection profile by analyzing the metadata of the collected thermal energy data from each of the supply facility, the complex facility, and the accommodation facility to identify an error or missing information in the collected thermal energy data.

3. The event management method of claim 1, wherein the generating of the history error profile comprises:

analyzing metadata of the error detection profile based on an error condition provided by a manager associated with at least one of the supply facility, the complex facility, and the accommodation facility to determine the continuous time-series pattern of the analyzed metadata; and generating the history error profile using the determined continuous time-series pattern of the metadata.

4. The event management method of claim 1, wherein the generating of the composite error profile comprises generating the composite error profile by analyzing a potential error occurring when the plurality of items of the collected thermal energy data are associated together according to the single linkage or the multiple linkages.

5. The event management method of claim 1, wherein the detecting of the type of the error comprises:

determining a similarity between metadata of the history error profile and metadata of the collected thermal energy data in which the error occurs by comparing the metadata of the history error profile with the metadata of the collected thermal energy data; and when there is the similarity between the metadata of the history error profile and the metadata of the collected thermal energy data, determining the type of the error to be the history error.

6. The event management method of claim 1, wherein the detecting of the type of the error comprises:

determining a similarity between metadata of the composite error profile and metadata of the collected thermal energy data in which the error occurs by comparing the metadata of the composite error profile with the metadata of the collected thermal energy data; and when there is the similarity between the metadata of the composite error profile and the metadata of the collected thermal energy data, determining the type of the error to be the composite error.

7. The event management method of claim 1, wherein the determining of the managed site comprises determining a managed site for error notification among the supply facility, the complex facility, and the accommodation facility using the identifier included in the metadata of the collected thermal energy data in which the error occurs.

8. An event management method comprising:

collecting, by a computing apparatus, thermal energy data from each of a supply facility, a complex facility, and an accommodation facility, wherein the supply facility supplies thermal energy, the complex facility distributes or transmits the thermal energy, and the accommodation facility consumes the thermal energy;

generating, by the computing apparatus, an error detection profile including metadata of the collected thermal energy data, the metadata including an identifier, a valid value range, and a data characteristic;

verifying, by the computing apparatus, whether a valid value of each of the collected thermal energy data falls within a valid data range defined by the valid value range of the error detection profile;

when the valid value does not fall within the valid data range, storing the collected thermal energy data as abnormal data in an error detection database and detecting, by the computing apparatus, whether a type of an error occurring in the abnormal data is a history error based on a history error profile representing a continuous time-series pattern of metadata of the error detection profile or a composite error based on a composite error profile representing a single linkage or multiple linkages among plural items of the collected thermal energy data; and determining, by the computing apparatus, a managed site of the thermal energy data in which the error occurs from among the supply facility, the complex facility, and the accommodation facility using the identifier included in the metadata, and transmitting to the determined managed site an event comprised of the detected type of the error as an alarm.

9. The event management method of claim 8, wherein the detecting of the type of the error comprises:

determining a similarity between metadata of the history error profile and metadata of the abnormal data by comparing the metadata of the history error profile with the metadata of the abnormal data; and when there is the similarity between the metadata of the history error profile and the metadata of the abnormal data, determining the type of the error to be the history error.

10. The event management method of claim 8, wherein the detecting of the type of the error comprises:

determining a similarity between metadata of the composite error profile and metadata of the abnormal data by comparing the metadata of the composite error profile with the metadata of the abnormal data; and when there is the similarity between the metadata of the composite error profile and the metadata of the abnormal data, determining the type of the error to be the composite error.

11. The event management method of claim 8, wherein the error detection profile comprises predetermined information required to identify the error in the collected thermal energy data, the history error profile comprises information obtained by analyzing metadata of the error detection profile, wherein the information is presented as the continuous time-series pattern of the metadata, and the composite error profile comprises information indicating a single linkage or multiple linkages among the plural items of the collected thermal energy data using the error detection profile.

12. A computing apparatus for performing an event management method, the computing apparatus comprising:

a processor, wherein the processor is configured to:

collect, from thermal data collectors respectively interworking with a supply facility, a complex facility, and an accommodation facility, thermal energy data of the supply facility, thermal energy data of the complex facility, and thermal energy data of the accommodation facility, wherein the thermal energy data of the supply facility includes data associated with supply of thermal energy, the thermal energy data of the complex facility includes data associated with distribution or transmission of the thermal energy, and the thermal energy data of the accommodation facility includes data associated with consumption of the thermal energy;

generate an error detection profile for each of the collected thermal energy data of the supply facility, the collected thermal energy data of the complex facility, and the collected thermal energy data of the accommodation facility by analyzing the collected thermal energy data, wherein each error detection profile includes metadata comprising an identifier, a valid value range, and a data characteristic for corresponding collected thermal energy data;

generate a history error profile from the error detection profile by determining a continuous time-series pattern of the metadata based on an error condition associated with at least one of the supply facility, the complex facility, and the accommodation facility;

generate a composite error profile from the error detection profile based on a single linkage or multiple linkages among a plurality of items of the collected thermal energy data;

determine whether an error occurs in the collected thermal energy data using the valid value range included in a corresponding error detection profile;

when the error occurs in the collected thermal energy data, detect whether a type of the error is a history error or a composite error based on the history error profile and the composite error profile;

based on a result of detecting the type of the error, determine a managed site among the supply facility, the complex facility, and the accommodation facility using identification information included in the metadata of the collected thermal energy data in which the error occurs; and transmit, to the determined managed site, an event comprised of the detected type of the error as an alarm.

13. The computing apparatus of claim 12, wherein the processor is configured to generate each error detection profile by analyzing the metadata of the collected thermal energy data from each of the supply facility, the complex facility, and the accommodation facility to identify an error or missing information in the collected thermal energy data.

14. The computing apparatus of claim 12, wherein the processor is configured to:

analyze metadata of the error detection profile based on an error condition provided by a manager associated with at least one of the supply facility, the complex facility, and the accommodation facility to determine the continuous time-series pattern of the analyzed metadata; and generate a history error profile using the determined continuous time-series pattern of the metadata.

15. The computing apparatus of claim 12, wherein the processor is configured to generate the composite error profile by analyzing a potential error occurring when the plurality of items of the collected thermal energy data are associated together according to the single linkage or the multiple linkages.

16. The computing apparatus of claim 12, wherein the processor is configured to:

determine a similarity between metadata of the history error profile and metadata of the collected thermal energy data in which the error occurs by comparing the metadata of the history error profile with the metadata of the collected thermal energy data; and when there is the similarity between the metadata of the history error profile and the metadata of the collected thermal energy data, determine the type of the error to be the history error.

17. The computing apparatus of claim 12, wherein the processor is configured to:

determine a similarity between metadata of the composite error profile and metadata of the collected thermal energy data in which the error occurs by comparing the metadata of the composite error profile with the metadata of the collected thermal energy data; and when there is the similarity between the metadata of the composite error profile and the metadata of the collected thermal energy data, determine the type of the error to be the composite error.

18. The computing apparatus of claim 12, wherein the processor is configured to determine a managed site for error notification among the supply facility, the complex facility, and the accommodation facility using the identifier included in the metadata of the collected thermal energy data in which the error occurs.

* * * * *